No. 655,339. Patented Aug. 7, 1900.
W. GATERMANN.
ATTACHMENT FOR FINGER BARS OF MOWERS OR HARVESTERS.
(Application filed May 12, 1899.)
(No Model.) 2 Sheets—Sheet 1.
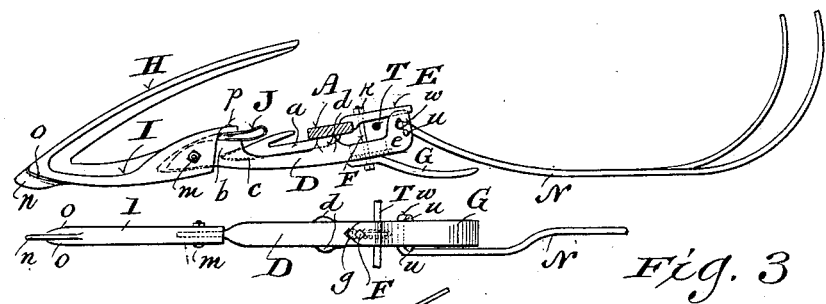
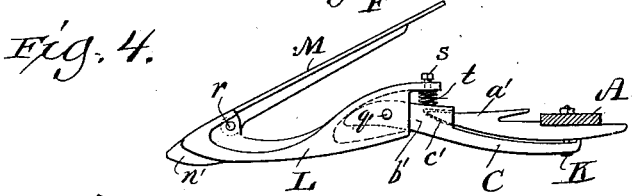
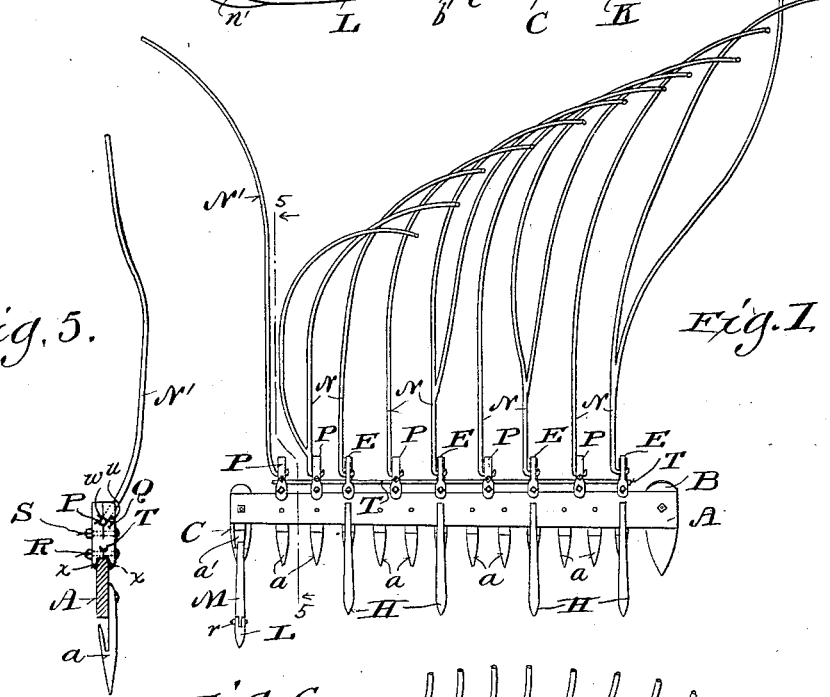
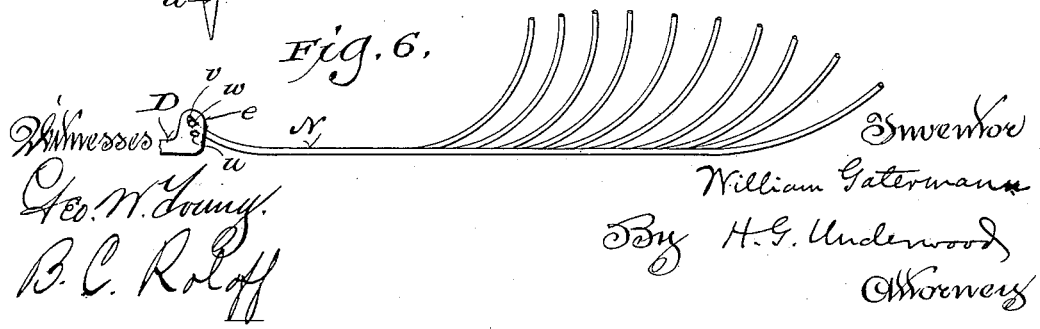

No. 655,339. Patented Aug. 7, 1900.
W. GATERMANN.
ATTACHMENT FOR FINGER BARS OF MOWERS OR HARVESTERS.
(Application filed May 12, 1899.)
(No Model.) 2 Sheets—Sheet 2.

Witnesses:
Geo. N. Young.
B. C. Roloff.

Inventor
William Gatermann
By H. G. Underwood
Attorney

UNITED STATES PATENT OFFICE.

WILLIAM GATERMANN, OF NEWTON, WISCONSIN.

ATTACHMENT FOR FINGER-BARS OF MOWERS OR HARVESTERS.

SPECIFICATION forming part of Letters Patent No. 655,339, dated August 7, 1900.

Application filed May 12, 1899. Serial No. 716,480. (No model.)

*To all whom it may concern:*

Be it known that I, WILLIAM GATERMANN, a citizen of the United States, and a resident of Newton, in the county of Manitowoc and State of Wisconsin, have invented certain new and useful Improvements in Attachments for the Finger-Bars of Mowers or Harvesters; and I do hereby declare that the following is a full, clear, and exact description thereof.

My invention has for its object to provide for the harvesting of peas by an ordinary mower or harvester; and it consists in certain peculiar devices attachable to the finger-bar of such a machine and designed for the purpose of separating a swath of pea-vines from the tangled mass in a field and for elevating the swath from the ground in advance of the mower-cut, as well as for turning back the uncut mass of vines and clearing them out of the way of the draft-animals and wheels of the machine for the following trip or round, all as will be more fully set forth hereinafter and subsequently claimed.

Figure 7:
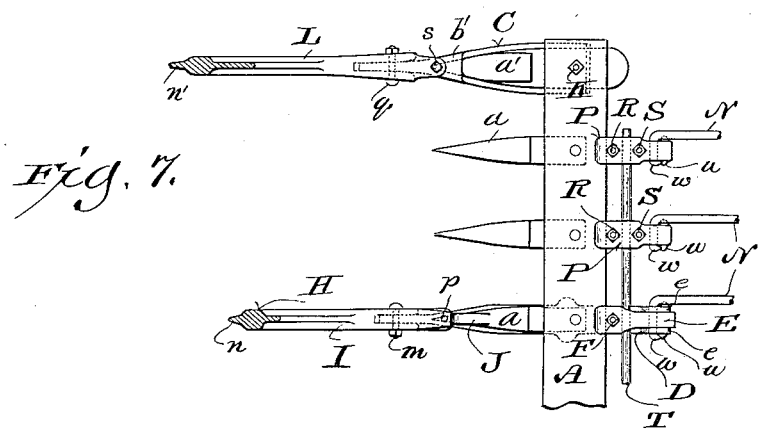
Figure 8:
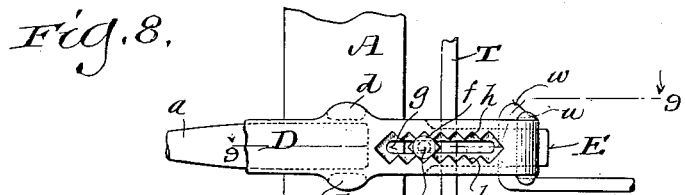
Figure 9:
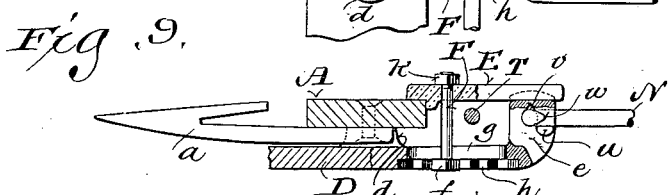
Figure 10:
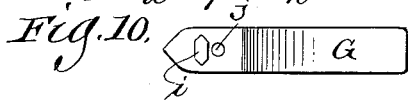
Figure 11:
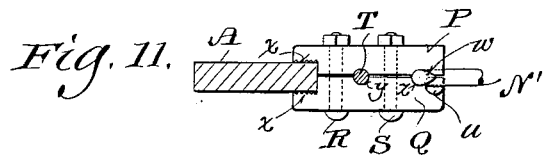
Figure 12:
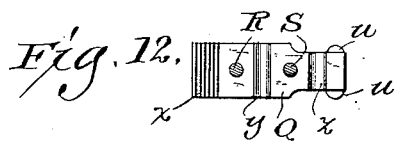

In the drawings, Figure 1 is a plan view of the finger-bar of an ordinary mower, with my invention applied thereto. Fig. 2 is a detail elevation illustrating a side view of one of the vine-lifters, together with means for attaching the same to the finger-bar, shown in section, and also showing one of the rearwardly-extending swath-removing fingers and a runner attached to the casting beneath the finger-bar. Fig. 3 is an under side view of the parts shown in Fig. 2. Fig. 4 represents the outer shoe and its attachments, forming a divider with an adjustable arm. Fig. 5 is a detail sectional view on the line 5 5 of Fig. 1, drawn to a slightly-enlarged scale. Fig. 6 is a side view of the swath-removing fingers. Fig. 7 is an enlarged detail plan view, partly in section, showing the outer shoe and parts adjacent thereto. Fig. 8 is an enlarged detail under side view of the parts shown at one end of Fig. 3, but omitting the runner shown in said former figure. Fig. 9 is a detail sectional view on the planes indicated by the line 9 9 in Fig. 8. Fig. 10 is a plan view of one of the runners. Fig. 11 is a still further enlarged view of certain of the parts shown in Fig. 5. Fig. 12 is a plan view of the lower clamp shown in Fig. 11.

Referring to the drawings, A represents the finger-bar of an ordinary mower, B the inner shoe on the wheel side, and C the outer shoe on the grain side. The cutter-bar is not shown and may be of any ordinary construction working in the guards *a a a*.

D, Fig. 2, represents a casting having upward-extending lugs *d d* on each side, which come in contact with the under side of the finger-bar A. The forward part *b* of this casting is increased in vertical thickness and terminates in a forward and slightly-downward projecting front end, while the rear portion of said part *b* is formed with a socket to receive the point of the guard *a*, as indicated by the double dotted lines marked *c* in Fig. 2. Back of the lugs *d d* the casting D continues for some little distance and terminates in a rounded upward-projecting heel *e*, the top of which is formed with a longitudinal groove to receive the rear end of a clamp E, whose forward end is shouldered to abut against the top and rear edge of the finger-bar A, as shown in Figs. 1 and 9.

F is a bolt having an angular or lozenge-shaped lower head *f*, and the shank of this bolt passes through a slot *g* in the casting D and through a hole in the clamp E, the angular head of the bolt being received between opposed angular recesses *h h* in the lower side of the casting D on each side of the said slot *g*. These recesses extend all around said slot, as best shown in Fig. 8, so as to provide for receiving the bolt-head at different points, according to the location of the bolt-hole in the clamp E, as same may be varied somewhat in different instances. Fig. 10 is a plan view of a part G, which I term a "runner," and in Figs. 2 and 3 I show the runner in place. This runner is usually attached to only certain of the castings D, as hereinafter explained, and may be altogether omitted, according to circumstances; but when it is used the lug *i* on the runner, which has angular ends, is applied between the walls of the recesses *h* in like manner to the just-described application of the bolt-head *f*, and then the bolt F is passed through the hole *j* in the runner and through the hole in the clamp E and fastened by a nut *k*, just as it would be fastened if the runner G was not used.

H H H represent the vine-lifters, (shown best in Figs. 2, 3, and 7,) consisting of upward and rearward extending arms formed integrally with a shoe I, the rear part of which is formed with a socket to receive the pointed front part b of the casting D, which latter is pivotally secured within the socket by means of the bolt m, the socket in the shoe I being somewhat larger than the said part b, as shown by the dotted lines in Fig. 2, so as to allow of a certain amount of vertical movement of the vine-lifter, regulated by a spring J, consisting of a strip of spring metal secured to the upper rear end of the shoe I, as shown at p, and projecting rearwardly, and then doubled and bent forwardly, so as to press down on the part b of casting D. At the forward end of each vine-lifter there is a downward-projecting rounded blade n, the lower front of the end of the said vine-lifter being formed with rounded shoulders o o on each side of said blade.

The outer shoe C consists of a casting somewhat similar to the forward part of the described casting D, the forward part b' of the casting C being increased in vertical thickness and terminating in a downward rounded projecting front end, while the rear portion of said part b' is formed with a socket to receive the point of the outer guard a', as indicated by the double dotted lines marked c' in Fig. 4; but the said outer guard a' differs from the other guards a a in that it extends back of the finger-bar A, while the casting or shoe C only extends just back of the longitudinal center of said finger-bar, to which it is secured by a bolt K, extending through the outer guard a' and clamping same securely between the shoe C and finger-bar A. The forward end b' of the shoe C is received in a socket in the rear end of another shoe L, to which it is pivotally secured by bolt q; but this socket is much larger than the socket in the rear end of the shoe I, so that the forward end of the shoe C has much greater play than the corresponding end of the casting D. The shoe L has an adjustable arm M jointed thereto and secured in adjusted position by bolt r and its nut, said arm M projecting upward and rearward similarly to the rigid arms of the vine-lifters H, the shoe L and its arm M forming a divider on the grain side of the device and having a forward-projecting blade n' similar to the blades n on the vine-lifters. The upper rear projecting portion of the shoe L is tapped and fitted with a set-screw s, whose shank is surounded by a spiral spring t, extending between said upper rear projecting portion of the shoe L and the part b' of the shoe C.

The heels e of the castings D are formed with projections or lugs u u on the sides thereof and above the plane of said lugs with transverse holes v, which are generally circular in shape, but have an upward elongation to permit the passage therethrough of the bent ends of the swath-removing fingers N N, said bent ends having rearwardly-turned terminations w. There are more of the swath-removing fingers N than there are castings D, and the other fingers N are supported by means of the double clamps P Q. (Best shown in Fig. 11.) These clamps have opposed shouldered and roughened or serrated jaws x x and transverse semicircular grooves y z, while the lower clamps Q are provided with the same projections or lugs u u as are on the heels of the castings D. These clamps P Q are secured to the finger-bar A by grasping the same between the jaws x x, as shown in Figs. 5 and 11, the clamps being held together by bolts R S. The bent ends of the fingers N are received in the described grooves z, while a brace-rod T is seated in the grooves y, this brace-rod serving to connect all of the series of clamps together, and thus strengthen the device, the said brace-rod T passing freely under the other style of clamp E between said clamps E and castings D. The clamps P Q next the outer shoe C serve to secure the bent end of a somewhat-different finger, which I have marked N' and call a "trailer," whose curved outer end turns in an opposite direction from the outer ends of the other fingers N, the said bent end, however, being of the same construction and held and secured in the same way as the bent ends of the other fingers.

In operation as the mower is driven forward the blades n n' on the vine-lifters and divider will slide along the ground under the tangled mass of pea-vines, cutting slightly into the ground, and said mass is separated by the divider-arm M from the vines in the field and then elevated by the arms H of said vine-lifters, so that their stalks are presented to the action of the knives on the cutter-bar, the cut vines being carried up by said arms over the finger-bar and dropped upon the swath-removing fingers N and by them swept to one side, while the trailer N' will lift and turn back all the uncut mass of vines, so that the horses and mower will have a clean broad track for the next trip. The fingers N N are made of spring-metal rods, and preferably some of them have branches, as shown, and as they slide along the ground they have considerable up-and-down motion of their free curved ends by reason of their loose connection where they simply rest on the projections or lugs u u instead of being tightly held to the clamps P Q or heels e of the castings D, which is a great advantage, especially on uneven ground. The rounded shoulders o o on each side of the blades n prevent the said blades and the shoes I from going too deeply into the ground, and the runners G are useful in crossing a furrow or with very soft ground in preventing the sagging down of the finger-bar before the vine-lifter shoes have passed over the same. By reason of the bolt r the divider-arm M can be adjusted so as to agree in height with the vine-lifter arms or to be at a higher or lower elevation with respect thereto, as may be desirable in any given instance, and similarly by reason of the set-screw s and spring t the relative inclination of the outer shoe C and divider-shoe L can be adjusted at will and a yielding or flexible connection of these parts insured. The springs J aid in securing a flexible and yielding connection between the vine-lifter shoes and the castings D and serve to insure a proper downward depression of the blades n, and the various details of construction of the several parts of my device result in a greatly-improved attachment for the purpose hereinbefore set forth.

Having thus described my invention, what I claim as new, and desire to secure by Letters Patent, is—

1. In combination with the finger-bar and guards of a mower or harvester, a series of castings, each having a forward and downward projecting front end with a socket for receiving the point of the guard, lugs for engagement with the finger-bar on each side of the guard, and an upward-projecting heel with a longitudinal groove in its upper surface; a series of clamps, whose forward ends engage with the finger-bar and whose rear ends fit within the said heel-grooves; bolts connecting said clamps and castings; a series of vine-lifting shoes, having upward and rearward extending arms rising therefrom and having sockets in their rear ends for the reception of the front ends of said castings; springs secured to the upper rear ends of said shoes and bearing down upon the forward ends of said castings; pivot-bolts connecting said shoes and castings; and swath-removing fingers loosely connected to the heels of said castings.

2. In combination with the finger-bar and guards of a mower or harvester, a series of vine-lifting shoes, a series of castings pivotally connected to said shoes and clamped to said finger-bar, and each casting terminating in a heel having laterally-projecting lugs thereon, and a transverse opening therethrough, said opening being of generally circular shape with an upward elongation, and a series of swath-removing fingers having curved free outer ends and bent inner ends with rearwardly-turned terminations, whereby said bent ends may be inserted through the transverse openings in the heels of the castings and rest loosely on the said laterally-projecting lugs.

3. In combination with the finger-bar and guards of a mower or harvester, a series of vine-lifting shoes; a series of guard-supporting castings pivotally connected to said shoes, and each casting having lugs for engagement with the under side of the finger-bar, an upward-projecting heel with a longitudinal groove in its upper surface, a longitudinal slot between said lugs and said heel, and a series of opposed angular recesses surrounding said slot on the under side of said casting; a series of clamps, whose forward ends engage with said finger-bar, and whose rear ends fit within the said heel-grooves, said clamps having bolt-holes therethrough; and a series of bolts passing through said bolt-holes in the clamp and said slots in the castings, and having angular lower heads for adjustable engagement with the said angular recesses in the castings.

4. In combination with the finger-bar and guards of a mower or harvester, a series of vine-lifting shoes, a series of guard-supporting castings pivotally connected to said shoes and clamped to said finger-bar, a series of swath-removing fingers loosely connected to said castings, and a series of runners rigidly secured to said castings and projecting rearwardly therefrom.

5. In combination with the finger-bar and guards of a mower or harvester, a series of vine-lifting shoes; a series of guard-supporting castings pivotally connected to said shoes and each casting having lugs for engagement with the under side of the finger-bar, an upward-projecting heel with a longitudinal groove in its upper surface, a longitudinal slot between said lugs and said heel, and a series of opposed angular recesses surrounding said slot on the under side of said casting; a series of clamps, whose forward ends engage with said finger-bar and whose rear ends fit within the said heel-grooves, said clamps having bolt-holes therethrough; a series of runners each having a bolt-hole therethrough, and an angular-ended lug on its upper surface for adjustable engagement with the said angular recesses in the casting; and a series of bolts, each uniting a runner-casting and clamp together.

6. In combination with the finger-bar of a mower or harvester, a series of castings transversely clamped thereto, and having heels at their rear ends formed with transverse holes therethrough, and laterally-projecting lugs below the planes of said holes; and a series of swath-removing fingers, having bent inner ends hooked within the transverse holes in the said heels of the castings and loosely supported on said laterally-projecting lugs, and free curved outer ends inclined toward the wheel side of the machine.

7. In combination with the finger-bar of a mower or harvester, and the outer guard on the grain side, a shoe beneath said guard, and connected by bolts thereto and to the finger-bar at the rear end of the shoe, and having a projecting front end with a socket therein for the reception of the point of said guard; another shoe having an enlarged socket at its rear end for the reception of the front end of the first-named shoe, and a rear projecting upper portion; a pivot-bolt for connecting the two shoes; a set-screw projecting downward through the said rear projecting upper portion of the second-named shoe, and a spring surrounding the shank of said set-screw between said projecting portion and the upper surface of the first-named shoe; an upward and rearward projecting divider-arm adjustably jointed to the forward end of said second shoe, and a set-bolt for securing said arm in its adjusted position.

8. In combination with the finger-bar of a mower or harvester, a series of pairs of clamps, each pair having opposed shouldered and roughened or serrated jaws for holding the said finger-bar between them, and inner and outer opposed transverse semicircular grooves, and laterally-projecting lugs; a brace-rod seated in the inner grooves and extending through all the pairs of clamps to strengthen and connect them together; a series of swath-removing fingers having bent ends seated in the outer grooves and resting loosely on the said laterally-projecting lugs; and series of bolts uniting the members of each pair of clamps on each side of said brace-rod.

9. In combination with the finger-bar of a mower or harvester, a series of clamps, transversely secured thereto, the opposing members of each pair of clamps being formed with opposed transverse semicircular grooves, and laterally-projecting lugs; a series of swath-removing fingers having bent ends hooked within the transverse grooves of all the pairs of clamps except the outer pair next to the grain side of the machine, and having free curved outer ends inclined toward the wheel side of the machine; and a trailer, formed of a single spring-metal rod, having a bent end hooked within the transverse groove of the said outer pair of clamps, and having a free curved outer end, inclined, back of the curved end of the adjacent swath-remover, in an opposite direction, and toward the grain side of the machine, to engage with, lift and turn over the uncut mass in the field, as the machine advances, the said swath-removing fingers and trailer resting on said laterally-projecting lugs.

In testimony that I claim the foregoing I have hereunto set my hand, at Manitowoc, in the county of Manitowoc and State of Wisconsin, in the presence of two witnesses.

WILLIAM GATERMANN.

Witnesses:
   A. L. HONGEN,
   E. J. ONSTAD.